United States Patent
Bernal et al.

(10) Patent No.: US 9,224,278 B2
(45) Date of Patent: Dec. 29, 2015

(54) AUTOMATED METHOD AND SYSTEM FOR DETECTING THE PRESENCE OF A LIT CIGARETTE

(75) Inventors: Edgar A. Bernal, Webster, NY (US);
Robert P. Loce, Webster, NY (US);
Graham Pennington, Webster, NY (US); Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1119 days.

(21) Appl. No.: 13/089,058

(22) Filed: Apr. 18, 2011

(65) Prior Publication Data

US 2012/0262583 A1   Oct. 18, 2012

(51) Int. Cl.
*H04N 5/33* (2006.01)
*G08B 13/196* (2006.01)
*G08B 17/12* (2006.01)

(52) U.S. Cl.
CPC .............. *G08B 13/196* (2013.01); *G08B 17/12* (2013.01); *H04N 5/33* (2013.01)

(58) Field of Classification Search
CPC ..... G08B 17/125; H04N 13/0246; H04N 5/33
USPC ......................................................... 348/164
See application file for complete search history.

(56) References Cited

U.S. PATENT DOCUMENTS

| 5,877,804 A * | 3/1999 | Otsuki et al. ................... 348/155 |
| 2010/0014781 A1* | 1/2010 | Liu et al. ........................ 382/285 |
| 2012/0087645 A1* | 4/2012 | Wu et al. ........................ 396/439 |

FOREIGN PATENT DOCUMENTS

JP         2010237971 A  * 10/2010

* cited by examiner

*Primary Examiner* — Andy Rao
*Assistant Examiner* — Obafemi Sosanya
(74) *Attorney, Agent, or Firm* — Kevin Soules; Kermit D. Lopez; Luis M. Ortiz (57) ABSTRACT

An automated method and system for detecting the presence of a smoking product utilizing a near infrared video-processing unit in real time. One or more near infrared (NIR) video capturing units can be configured to capture a video feed. The video feed can be processed by the video-processing unit in order to detect a smoking product (e.g., a lit cigarette) within a field of view of the video capturing unit. A near infrared video sequence can be read and analyzed for the presence of a "hot spot" of a predetermined size based on pixel color information. In some cases, the motion of the hot spot can be tracked in response to the detection of the hot spot. An alarm signal can also be triggered in some cases, if the pattern of motion is consistent with that of a cigarette being smoked.

29 Claims, 8 Drawing Sheets

AUTOMATED METHOD AND SYSTEM FOR DETECTING THE PRESENCE OF A LIT CIGARETTE

TECHNICAL FIELD

Embodiments are generally related to cigarette smoking detection methods and systems. Embodiments are also related to smoking and fire alarm devices, techniques, and systems. Embodiments are additionally related to the detection of lit cigarettes.

BACKGROUND OF THE INVENTION

Cigarette smoking is becoming increasingly prohibited in many locations such as, for example, near gas pumps, in office buildings, commercial stores, theaters, restaurants, government buildings, bars, nightclubs, and so forth. Certain buildings, for example, now include non-smoking zones, which oblige the smoker to stand at a certain distance from the building facility. Despite the many federal, state, and local government imposed smoking prohibitions or restrictions currently in place, many individuals continue to ignore such restrictions and engage in smoking activities in public places or locations where smoking is simply not allowed or desired.

Conventional smoke detectors are operative to sense or detect smoke through the use of dual ionization, photoelectric or combined ionization-photo electric smoke detection units. Because these devices are operative only to detect moderate to heavy levels of tobacco smoke, they are largely ineffective in outdoor areas or in large, well ventilated rooms where the tobacco smoking activity may occur in a location which is some distance from the smoke detector, thus not providing a sufficient level of smoke for detection by the smoke detector.

A very different approach to determine if a smoker is "lighting up" involves the use of UV (Ultraviolet) flame detectors (not smoke detectors) to identify the initiation of a flame from, for example, a cigarette lighter or match followed by the sounding of an alarm either overtly or covertly. Such a prior art approach thus detects the ultraviolet radiation of the lit match or lighter. One of the problems with this approach is that the smoker must actually light up the cigarette in the direct presence of the detector, but the detector may not detect important situations such as, for example, when a smoker carries a lit cigarette from a driver's seat to a gas pump.

In general, such smoke detectors are very inexpensive, but do not function well in areas with good ventilation. On the other hand, a lit match detector or lighter detection device works well in areas that are well ventilated, but such devices are very expensive and do not detect when a lit cigarette enters the area.

Based on the foregoing, it is believed that a need exists for an improved system and method for detecting the presence of a lit cigarette, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved cigarette smoking detection method and system.

It is another aspect of the disclosed embodiments to provide for an improved method and system for detecting the presence of a lit cigarette utilizing a near infrared (NIR) or infrared (IR) video-processing unit.

It is a further aspect of the present invention to provide for an improved real-time alarm method and system.

The aforementioned aspects and other objectives and advantages can now be achieved as described herein. An automated method and system for detecting the presence of a lit cigarette utilizing one or more infrared video-processing units is disclosed herein. One or more IR/NIR video capturing units can be configured in, for example, an open-air region (e.g., fuel pumping station, non-smoking premises, etc.) to capture a video feed. The video-processing unit can process the video feed in order to assist in the detection of the lit cigarette within the field of view of the video capturing unit. An IR/NIR video sequence can be read and a background subtraction performed, if a static background is visible in the IR/NIR video sequence under a default lighting condition. The presence of a "hot spot" of a pre-determined size can be monitored based on pixel color information and the motion of the hot spot tracked in response to the detection of the hot spot. An alarm signal can then be triggered, if a pattern of motion is consistent with that of a cigarette being smoked.

Devices that capture visible light can be configured to capture NIR by removal of an IR filter. The background removal can be performed by computing an absolute color difference between a known background image and each image in the video sequence when the video capturing unit is stationary with controlled lighting. The background removal can also be performed by finding an absolute difference between adjacent frames in the video sequence and/or by averaging the frames over a specified period of time when the lighting conditions change. Also, a decision can be made based on the change of pixel values within a specified time lapse to perform background removal. A temporal histogram of pixel values within the set of video frames being considered for each pixel can be calculated. The most frequent pixel value can be considered as a background value and clustering techniques can be employed around this value to determine the boundaries between the background and foreground values.

The presence of a hot spot in the video sequence can be monitored by determining color separation between the pixels in the image of the lit cigarette and the pixels in the background image. Further, a threshold and/or a clustering technique can be employed to determine whether the size of the moving hot spot is equal to the expected size of the lit cigarette tip (in pixels) based on the pixel color information. The motion of the hot spot can be tracked by detecting an object of interest at each frame and associating a detected target across the frame with a single object based on location, color, and shape attributes.

A template-matching test can be performed between the estimated motion and the pattern of motion that is expected for the cigarette being smoked according to the position of the IR/NIR video capturing unit. A similarity or dissimilarity between the actual motion pattern and the motion template can be computed. The alarm and/or a pre-specified event can be triggered if the computed similarity metric falls above or below a predetermined threshold, respectively. Optionally, the hot spot motion pattern can be preprocessed prior to the template matching. Such a low cost-system effectively monitors and detects lit cigarettes in well-ventilated large rooms or outdoor areas outside of a building.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Note that as utilized herein, the term "cigarette" refers generally to a smoking product which includes, for example, cigarettes, cigars, smoking pipes, and the like. Typically, cigars burn slightly cooler than cigarettes, at a temperature of, for example, 600° C. with significant variations depending on the type of cigar. This level of temperature can be well detected via one or more of the disclosed embodiments. Smoking pipes tend to burn tobacco at yet a lower temperature of, for example, 500° C. At some angles, the tobacco may be directly viewable by the camera and would be detectable via one or more of the disclosed embodiments. At other angles only the outside of the pipe would be viewable. A typical pipe bowl is approximately five times the size of a cigarette head and much cooler, but also significantly hotter than the background so that it can also be detected via one or more of the disclosed embodiments. To detect pipes, the image can be examined for a "hot spot" roughly four to six times the size of a typical cigarette and with slightly lower brightness in the IR/NIR range than a cigarette, but still near the maximum brightness in the image.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment, or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

The computer program code for carrying out operations of the present invention may be written in an object-oriented programming language (e.g., Java, C++, etc.). The computer program code, however, for carrying out operations of the present invention may also be written in conventional procedural programming languages such as the "C" programming language or in a visually oriented programming environment such as, for example, VisualBasic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special-purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the block or blocks.

Figure 1:
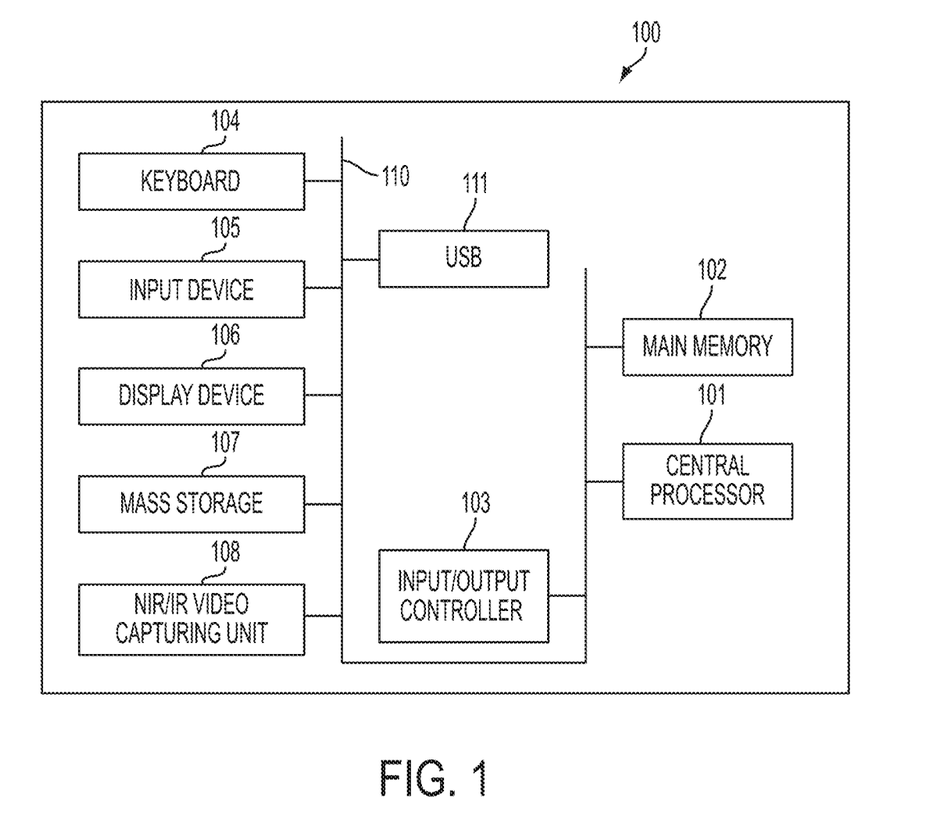
FIG. 1 illustrates a schematic view of a computer system and NIR/IR video camera sensor, in accordance with the disclosed embodiments.
Figure 2:
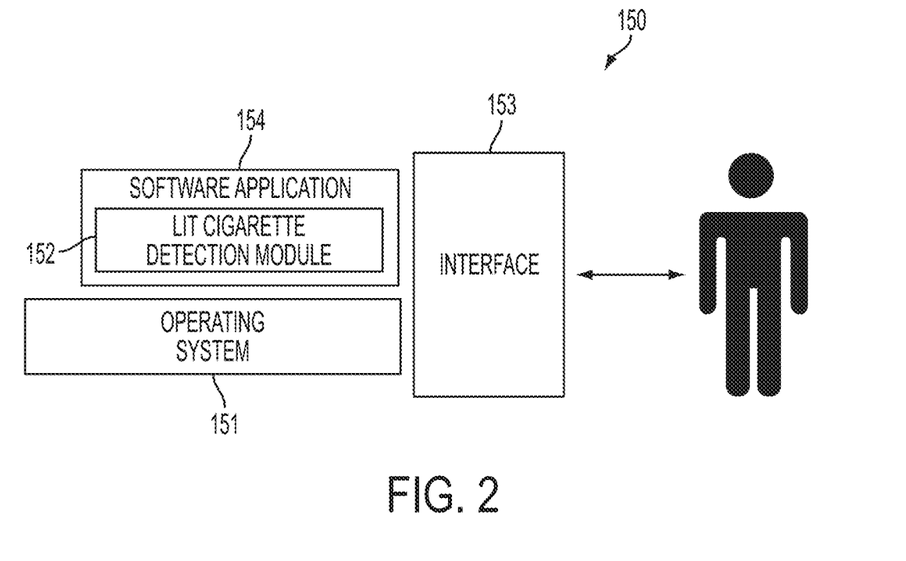
FIG. 2 illustrates a schematic view of a software system including a lit cigarette detection module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device such as a mouse, track ball, pen device, etc.), a display device 106, a mass storage 107 (e.g., a hard disk), and a USB (Universal Serial Bus) peripheral connection 111. Additional input/output devices associated with system 100 include, for example, a near infrared (NIR) and/or an infrared (IR) video-capturing unit 108 (e.g., video camera, etc.). Note that although the unit 108 is shown as a single "block" in FIG. 1, it can be appreciated that this single block can denote just one video capturing unit 108 (e.g., a single video camera) or multiple video capturing units 108 (e.g., a group of video cameras). As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of systems are possible. For example, rather than a traditional "Windows" system, other operating systems such as, for example, a Real Time Operating System (RTOS) more commonly employed in wireless systems may also be employed with respect to operating system 151 and interface 153. The software application 154 can include, for example, a lit cigarette detection module 152 for detecting the presence of a lit cigarette in a region of interest. The lit cigarette detection module 152 can include instructions such as those of method 400 discussed herein with respect to FIG. 4.

FIGS. 1-2 are thus intended as an example and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms including Macintosh, UNIX, LINUX, and the like.

Figure 3:
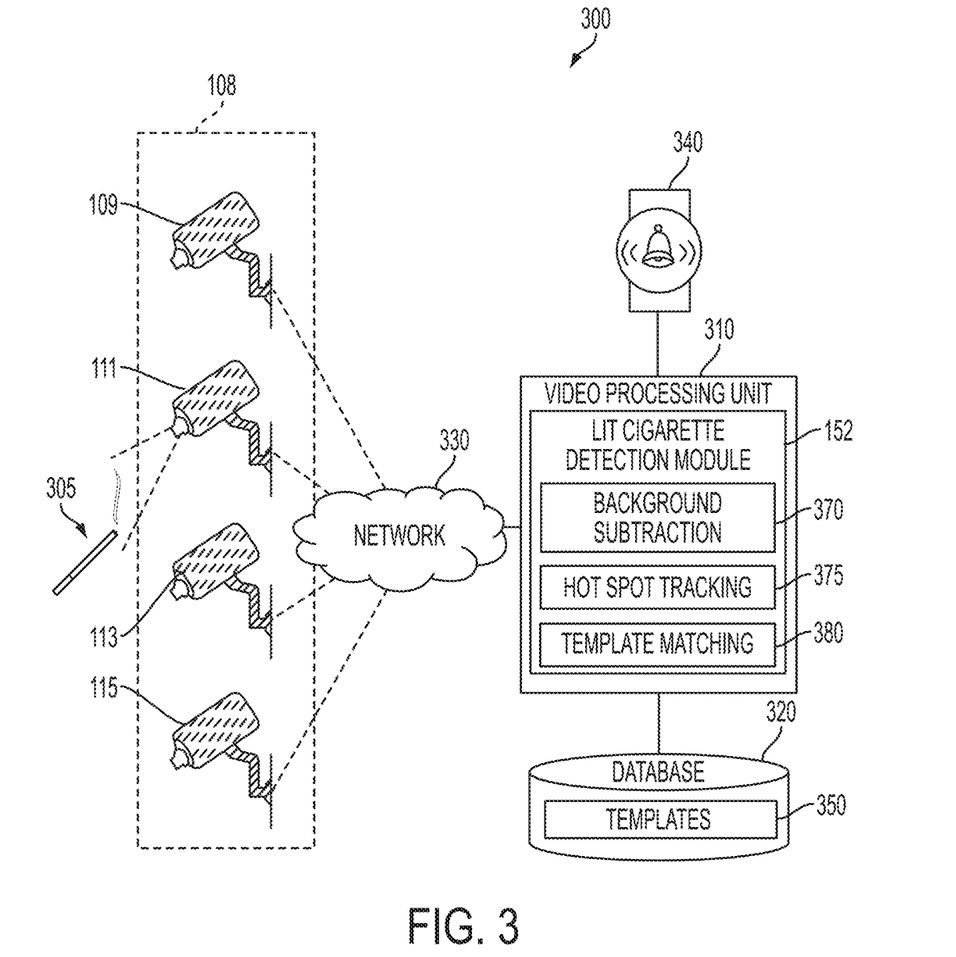
FIG. 3 illustrates a block diagram of a lit cigarette detection system for determining the presence of a lit cigarette, in accordance with the disclosed embodiments.

FIG. 3 illustrates a block diagram of an automated lit cigarette detection system 300 for detecting the presence of a lit cigarette 305 in an open-air region, in accordance with the disclosed embodiments. Note that in FIGS. 1-10, identical or similar blocks are generally indicated by identical reference numerals. In some embodiments, the lit cigarette detection system 300 can include the use of one or more suitable inexpensive devices or cameras for implementing the NIR/IR video capturing unit 108, the video-processing unit 310, and/or an alarm 340. As shown in FIG. 3, the NIR/IR video capturing unit 108 can include, for example, one or more NIR/IR video cameras 109, 111, 113, and/or 115.

In general, the IR/NIR video capturing unit 108 monitors and captures a video feed of a non-smoking zone. The IR/NIR video capturing unit 108 can be additionally designed to be compact and rugged in order to meet the requirements of various outdoor applications and extreme climate conditions. In some embodiments, the IR/NIR video capturing unit 108 can be implemented as a low resolution and low frame rate IR/NIR video capturing unit such as, for example, a 320×256 pixel, a 640×512 pixel, a 320×240 pixel, or a 640×480 pixel video capturing unit, depending upon the design goals of system 100. The IR/NIR video capturing unit 108 can also include built-in integrated functions such as, for example, image-processing, data formatting, and data compression functions. Additionally, the IR/NIR video capturing unit 108 can include imager-positioning functions, range-finding operations, and a flash bulb.

The video-processing unit 310 can be, for example, a data-processing system such as system 100 depicted in FIG. 1, and can communicate with an alarm 340 and a database 320. The video processing unit 310 shown in the example of FIG. 3 generally includes a lit cigarette detection module 152 that in turn is composed of a background subtraction module 370, a hot spot tracking module 375, and a template-matching module 380.

In some embodiments, the video-processing unit 310, the IR/NIR video capturing unit 108, and the alarm system 340 can communicate with a network 330. Note that network 330 can be, for example, the "Internet" representing the world-wide collection of networks and gateways that use the Transmission Control Protocol/Internet Protocol (TCP/IP) suite of protocols to communicate with one another. Of course, network 330 can be another type of network such as a simple wireless network, an internal organizational "Intranet" and so forth.

The video capturing unit 108 can be implemented as an inexpensive, low resolution, low frame rate camera (or group of cameras such as cameras 109, 111, 113, and/or 115) for IR/NIR video acquisition. In some cases, the low-end portion of the near-infrared spectrum (e.g., 700 nm-1000 nm) can be captured with, for example, the video capturing unit 108 and/or other devices that capture visible light. In general, such devices that capture visible light can be configured to capture the NIR by removal of the IR filter. For example, CCD and CMOS sensors found in commercially available digital photo and web cameras are sensitive to the low-end portion of the IR band. Such cameras can be employed as the IR/NIR video capturing unit 108 by removing the filter behind the lens assembly. In some settings where radiation in the visible spectrum is significantly stronger than radiation in the IR portion of the spectrum, it can be advantageous to include a filter that blocks visible radiation. Reducing the signal from the visible radiation yields the benefit of a more accurate determination of a "hot spot."

The lit cigarette detection module 152 configured in association with the video-processing unit 310 processes the captured video in order to determine whether a lit cigarette is within the field of view of the video capturing unit 108. The video-processing unit 310 can read the captured video sequence in order to perform a background subtraction 370 if a static background is visible in the near infrared video sequence under a default lighting condition. The video-processing unit 310 can inexpensively remove the background in order to highlight moving objects in the foreground of the video sequence when the static IR/NIR video capturing unit 108 is employed to capture the video feed.

The video-processing unit 310 can further monitor the video sequence in order to identify a "hot spot" by determining color separation between the pixels in the image of the lit cigarette 305 and the pixels in the background image. In general, a "hot spot" is defined as a region of pixels in a digital image at a brightness level near the maximum brightness of the image, where the pixels in that region are connected neighbors. When the camera sensor is single-channel, detection of a hot spot based on color information may be performed via thresholding operations, where all the pixels having intensity values larger than a certain threshold T are labeled as being part of a hot spot. The value of T can be calculated from quantities describing the statistical behavior of the pixel values in an image. For example, T can be made equal to the mean or average value of the image pixel values plus the standard deviation of said values times a predetermined constant, the value of this constant being dependent on the exposure settings of the camera. Other approaches to determining the value of T include histogram-based approaches, in which a histogram containing the relative frequency of occurrence of intensity values within the image is calculated. The presence of multiple peaks in the histogram provides an indication of multiple pixel classes and the location of valleys in between peaks make for good segmentation threshold values. More robust histogram-based thresholds include those that maximize the separability between the different pixel classes while minimizing the variance of each resulting class, as well as those calculated by iteratively improving an initial guess until a certain stopping criterion is reached.

When the camera sensor has multiple channels, an optimal threshold can be selected from the channel whose histogram gives the best separation between hot spot and background pixels according to the target metrics being optimized. For example, segmentation can be performed on the channel for which the optimal threshold yields the smallest inter-class separability measure. Specifically, if the camera has an n channel sensor, then n different thresholds $T_1, T_2, \ldots, T_n$ can be calculated, each one optimizing (e.g. minimizing or maximizing) segmentation criteria $\sigma_1, \sigma_2, \ldots, \sigma_n$ within each color channel. Examples of such criteria include within class variance, $\sigma_w^2$, which is defined as the weighted average of the variances of each of the resulting segmentation classes. According to this definition, an optimal threshold can minimize $\sigma_w^2$, which results in classes with as small per-class spread as possible. Another example of segmentation criteria is the between-class variance, $\sigma_B^2$, which can be defined as the weighted average of the squared distances between the global mean and the mean of each of the classes. According to this definition, an optimal threshold can maximize $\sigma_B^2$, which results in classes that are maximally separated from each other. The global optimal threshold is the threshold $T_i$ that produces a globally optimal $\sigma_i$ (e.g., the smallest or the largest among the set $\{\sigma_1, \sigma_2, \ldots, \sigma_n\}$). Segmentation would then be performed based on the pixel's i-th color value, regardless of its remaining n−1 values. Alternatively, segmentation may be performed in the multi-dimensional pixel-value space by taking into account all n color values of every pixel. Clustering techniques such as K-means clustering or the Expectation-Maximization (EM) algorithm can be used in this scenario. Other classification techniques such as Support Vector Machine (SVM) or Bayes classifiers can be used as well.

In addition to color-based hot-spot segmentation algorithms, the spatial relationship between the pixels can also be used to create a detection rule. For instance, if a threshold T has been determined to be optimal in separating hot-spot pixels, then the set of pixels having values larger than T is tested for connectivity, for example, by using 4- or 8-neighbor connectivity rules. Optionally or additionally, a morphological filtering step can be applied prior to the connectivity test to yield more robust hot-spot pixel classification against noise. For example, morphological open or close operations can be used to remove or include small regions of misclassification due to noises. Pixels that satisfy the threshold constraint and that are connected to other pixels that also satisfy that constraint are labeled as being elements of a component set. The number of elements or size of that component set is indicative of whether that set of pixels corresponds to a hot spot or not.

Additional criteria that can be used for the detection of a hot spot include the characteristics of motion patterns of connected components having been identified as candidates for hot spots. The video-processing unit 310 monitors the video sequence in order to detect the hot spot by isolating foreground moving objects. Upon detection of the presence of the hot spot, the motion of the hot spot can be tracked by associating the lit cigarette 305 across different frames of the video feed utilizing a hot spot tracking module 375. The motion of the spatial location of the lit cigarette tip with time can be extracted via a template-matching module 380. A template matching operation via the template-matching module 380 can be performed between the estimated motion and the pattern of motion that is expected for the cigarette being smoked according to the position of the video capturing unit 108. One or more templates 350 describing various actions of the motion of the cigarette being smoked such as taking the cigarette to the mouth, holding it momentarily while drawing on the cigarette, and lowering the cigarette can be stored in a database 320 associated with the video-processing unit 310.

The similarity or dissimilarity between the actual motion pattern and the motion template can be computed. If the computed similarity metric is above a particular threshold, then the detected motion pattern is sufficiently similar to the stored motion template and an alarm can be triggered. If, however, the metric falls below the threshold, then the detected motion pattern is not similar to the stored template and it is not utilized to trigger the alarm, although the alarm can be triggered by other processing results. In general, the system 300 triggers the alarm 340 indicating an unwanted presence of the lit cigarette 305 by monitoring an outdoor non-smoking zone. Optionally, some preprocessing of the hot spot motion pattern such as pre-screening (e.g., based on the object speed), speed-based trajectory normalization, trajectory smoothing to remove frame-to-frame inconsistencies, compensation for effects of the NIR video capturing unit 108 motion, and/or human motion in the trajectory, etc., may be applied prior to the template matching operations and instructions provided by the template matching module 380. Note, however, that such an approach is not restricted to, nor requires motion pattern matching, but can be utilized to increase the robustness of the overall results.

The change in brightness of the hot spot can add confidence to the lit cigarette detection. Additionally, detection of the hot spot near a face or hand of a person can increase the confidence of the overall lit cigarette detection. The face or hand of a person can be detected utilizing hand/face recognition techniques. Also, the detection of a separation between the hot spot and a person can indicate that a cigarette is dropped or discarded, which can be useful information. Such information can be employed to trigger a gas station attendant to rush out and pick up the cigarette.

Figure 4:
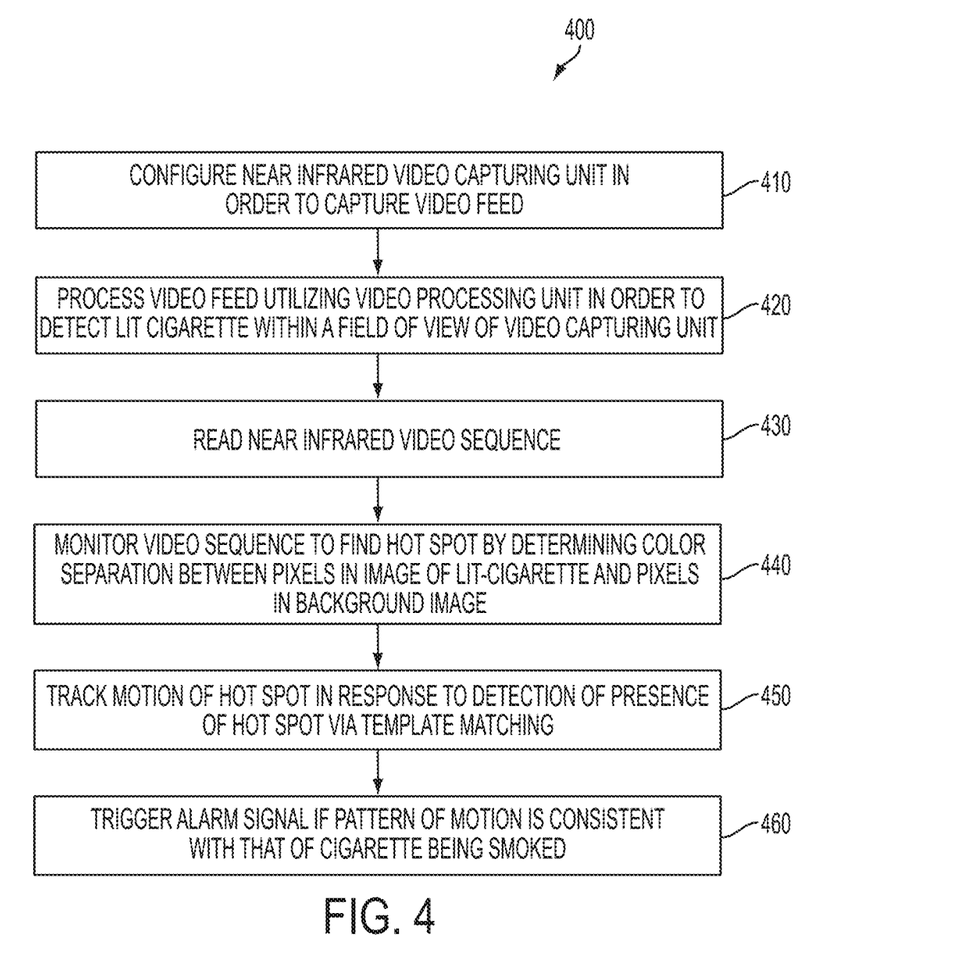
FIG. 4 illustrates a high-level flow chart of operations depicting logical operational steps of a method for detecting the presence of a lit cigarette in an open-air region in real time, in accordance with the disclosed embodiments.

FIG. 4 illustrates a high level flow chart of operations illustrating logical operational steps of a method 400 for detecting the presence of the lit cigarette 305 in real-time, in accordance with the disclosed embodiments. The near infrared (NIR) video capturing unit 108 can be configured to capture a video feed, as illustrated at block 410. Thereafter, as depicted at block 420, the video feed can be processed via the video-processing unit 310 in order to determine whether a cigarette is lit within a field of view of the video capturing unit 108. Next, as indicated at block 430, the near infrared video feed can be read and optionally a background subtraction can be performed to increase robustness if the signal of the "hot spot" can be enhanced by this step (e.g. when a static background is visible in the near infrared video under a default lighting condition or when a dynamic background estimation is performed to track the lighting condition of the open area etc.).

Background removal via the background subtraction module 370 can be performed, for example, by computing the absolute color difference between a known background image and each image in the video sequence when the video capturing unit 108 is stationary with controlled lighting. The exposure settings of the NIR video capturing unit 108 can be preferably set low, as the lit cigarette 305 possesses a strong signature in the NIR band, which easily saturates the sensor under the brightest lighting conditions expected. The background removal 370 can also be performed by finding an absolute difference between adjacent frames in the video sequence and/or by subtracting out the estimate of background image derived from averaging the frames over a specified period of time. Also, a decision can be made based on the change of pixel values within a specified time lapse to perform the background removal 370. A temporal histogram of pixel values within the set of video frames being considered for each pixel can be calculated. The most frequent pixel value can be considered a background value and clustering techniques can be employed around this value to determine the boundaries between background and foreground values.

The presence of the hot spot of a pre-determined size can be monitored by determining color separation between pixels in an image of lit cigarette 305 and pixels in background image, as indicated at block 440. The hot spot can be detected based on parameters such as IR/NIR color components and spatial characteristics of the lit cigarette 305. Thereafter, a determination can be made whether the size of the hot spot actually corresponds to the lit cigarette tip based on the pixel color information utilizing a threshold or clustering technique. The video-processing unit 310 can represent enough color separation between the pixels in the image of the lit cigarette 305 and the pixels in the background image when the lit cigarette 305 enters a video scene. The color characteristics of the lit cigarette tip depends on the integration or exposure time settings for a fixed f-stop (diameter of the entrance pupil in terms of focal length of the IR/NIR video capturing unit 108 lens).

Knowledge of the geometry of the viewing configuration of system 300 allows for a determination of the expected hot spot size in terms of the number of pixels. The system 300 can still rely on the spatial information, if exposure settings do not yield adequate separation between the background and the lit cigarette tip in order to perform the lit cigarette detection. The value and range of such parameters depend on the spatial configuration of the system 300. For example, the NIR video capturing unit 108 with a 300×256 pixel sensor with 20 µm×20 µm pixel spacing covers a total sensor area of 6.00 mm×5.12 mm. If the sensor is located 20 mm behind the lens, then the image of a 1 cm lit cigarette tip located at a distance of 5 m from the NIR video capturing unit 108 has a 2 pixel diameter. These dimensions are described for purposes of clarity and specificity; however, they should not be interpreted in any limiting manner. However, it will be apparent to those skilled in the art that other dimensions can be utilized as desired without departing from the scope of the invention. Note that cigarettes typically have a diameter of around 7 mm, while cigars can be as large as 20 mm. A hot spot of interest may have a size in the range of 2 to 30 mm (e.g., for cigars and cigarettes, and larger for pipes, up to 50 mm).

Figure 5:
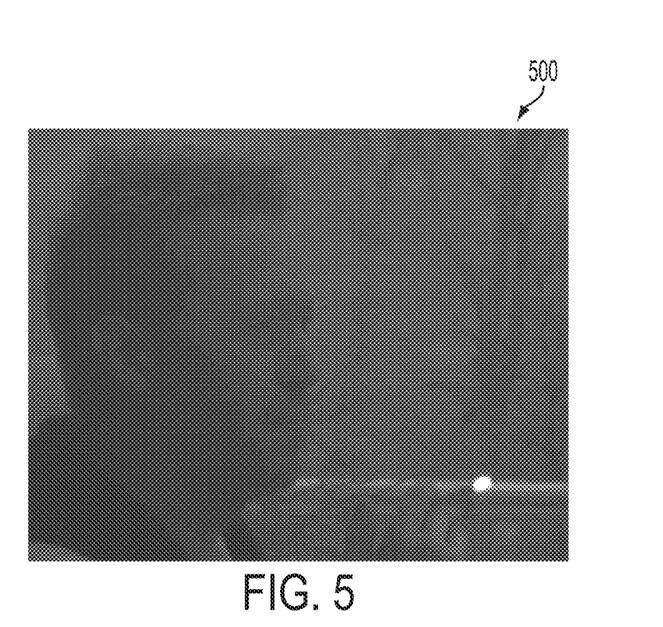
FIGS. 5-8 illustrate sample input and processed near infrared images of a detected lit cigarettes, in accordance with the disclosed embodiments.
Figure 6:
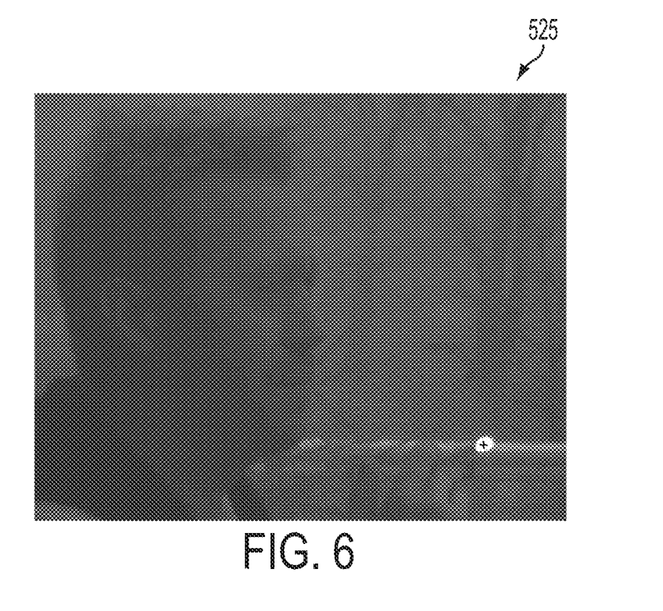
Figure 7:
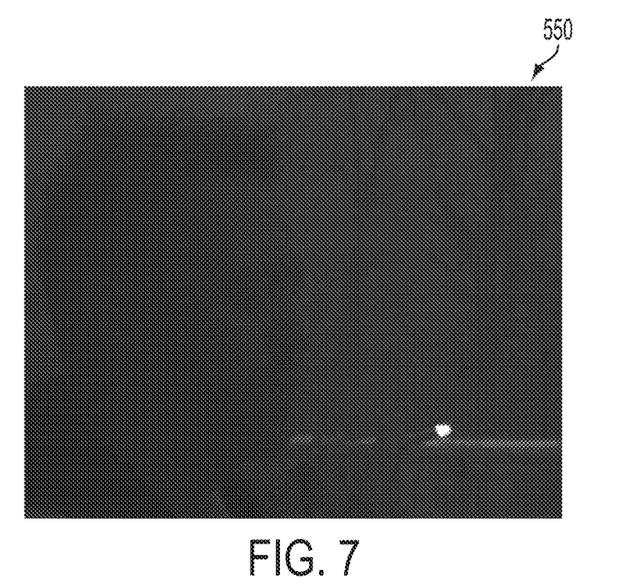
Figure 8:
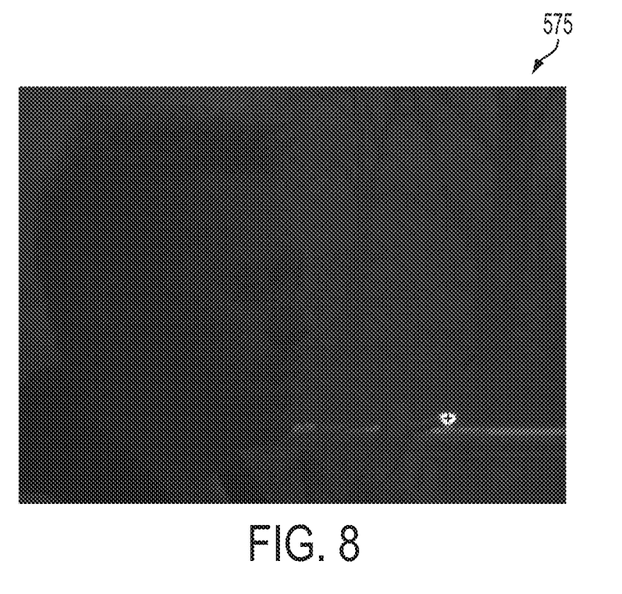

The motion of the hot spot can be tracked upon detection of the presence of the hot spot, as illustrated at block 450. FIGS. 5-8 represent sample input and processed frames of the detected cigarette tip 305 with an estimated tip position highlighted with a cross, in accordance with the disclosed embodiments. FIGS. 5-6 illustrate an acquired NIR image 500 and a processed NIR image 525 of the detected lit cigarette 305 with a 600 µs exposure time. FIGS. 7-8 illustrate an acquired NIR image 550 and a processed NIR image 575 of the detected lit cigarette 305 with an example 300 µs exposure time. The color/shape characteristics and the location of the lit cigarette 305 can be associated across different frames in order to track the moving hot spot. The tracking of the lit cigarette 305 can be performed by the low-resolution NIR video capturing unit 108 as a typical cigarette moves at a rate of a few cm/s, requiring no major frame rate capabilities. The tracking of the hot spot can also be performed utilizing various advanced techniques such as, for example, optical flow, mean-shift tracking, contour tracking, and Kalman and Particle Filtering.

Figure 9:
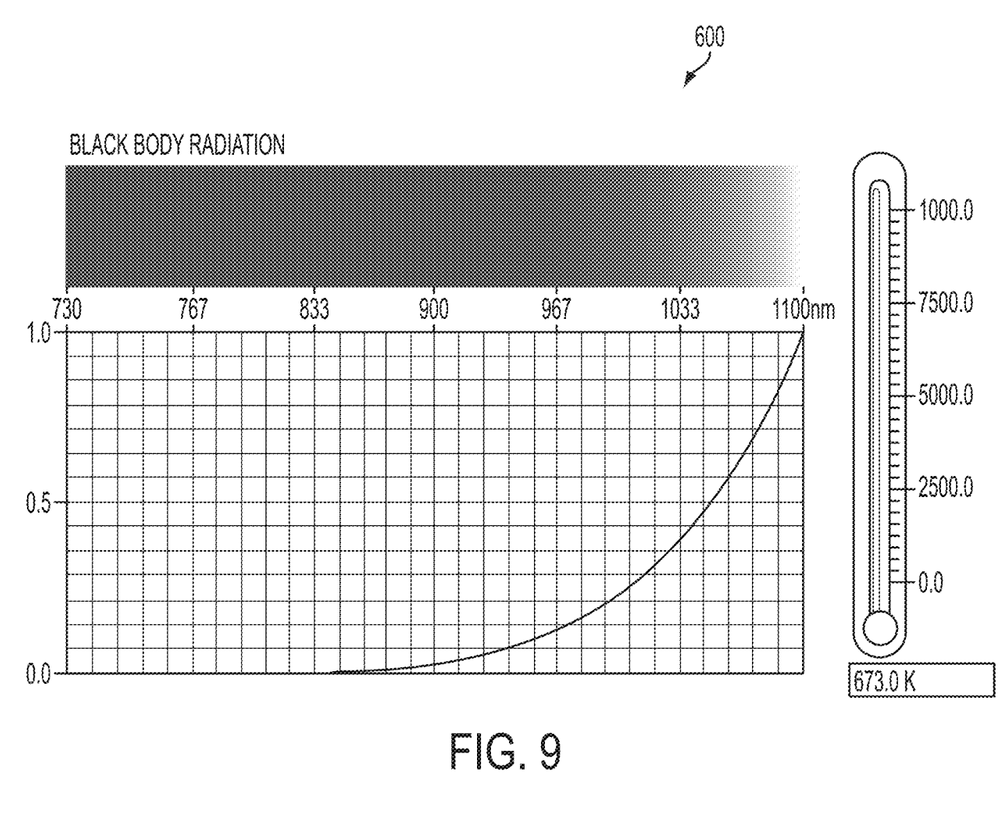
FIG. 9 illustrates a graph of the blackbody radiation spectrum for a temperature of 673° K in the IR/NIR band, in accordance with the disclosed embodiments.

FIG. 9 illustrates a graphical model 600 of the blackbody radiation spectrum for a temperature of 673° K in the NIR band. The graphical model 600 demonstrates the hot spot as a signal in the NIR range and additionally indicates that an NIR camera as described herein can be utilized to sense the hot spot. The blackbody radiation model 600, as shown in FIG. 9, can predict the radiation spectrum (i.e., in the vicinity of NIR) for a temperature of 400° C., or 673° K, the typical temperature of the side of the lit cigarette tip. The head on the middle portion of the tip is hotter (e.g. 580° C.) and the temperature while drawing even hotter (e.g., 700° C.) as shown in FIG. 9. The hotter temperatures can appear as a larger or brighter hot spot in the image compared to the side view while not drawing. The NIR video capturing unit 108 with more than one wavelength band in the IR can be employed for getting a ratio of brightness for the hot spot between the bands, which can be compared to the same two bands for the blackbody radiator at same temperatures. The certainty in the detection of the lit cigarette 305 can be increased if the ratios are similar.

Figure 10:
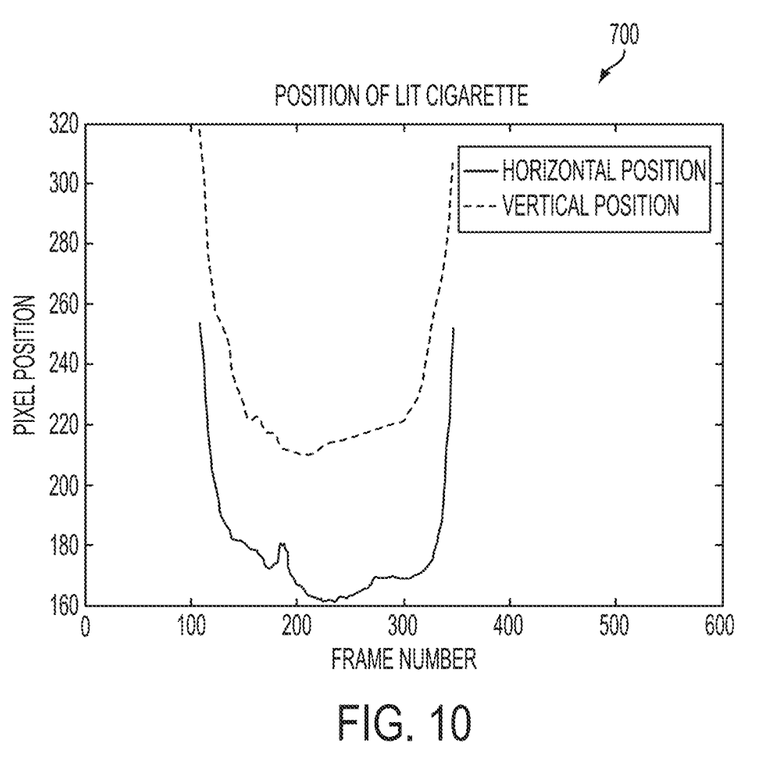
FIG. 10 illustrates a graphical representation of trajectory of a hot spot, in accordance with the disclosed embodiments.

FIG. 10 illustrates a graphical representation 700 of a trajectory of a hot spot, in accordance with the disclosed embodiments. The frames for which the cigarette tip 305 is not detected have no position data associated with them. The alarm signal can be triggered if the pattern of motion is consistent with that of a cigarette being smoked, as depicted at block 460. Note, however, that in another scenario the warning alarm can be signaled when a hot spot is identified and can alert personnel for visual conformation or further utilize the matching of motion pattern technique discussed herein. The exposure settings (i.e., exposure time) of the NIR video capturing unit 108 can be set such that the lit cigarette tip provides pixel levels near the saturation level of the system 300 (e.g., near 255 for an 8-bit system). If the video feed is captured during the daytime, the exposure values of the NIR video capturing unit 108 can be varied to simulate various lighting conditions, including nighttime with no external sources of light.

Alternatively, the NIR video capturing unit 108 may be configured to permit dynamic exposure adjustment and pan/zoom/tilt when the lit cigarette 305 is detected. The automated cigarette detection system 300 can be a multiple NIR video capturing unit 108 surveillance system, where at least one NIR video capturing unit 108 (e.g., visual, mid- to high-resolution NIR) can be configured to monitor the activity within a region of interest while at least one additional low-resolution NIR video capturing unit 108 can be configured to exclusively perform lit cigarette detection within a portion of the region of interest. Such system 300 provides a low-cost solution for detecting and monitoring the presence of the lit cigarette 305 in outdoor areas.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A non-transitory computer-implemented method for detecting a smoking product, said method comprising:
   configuring at least one NIR/IR video capturing unit to capture a video feed in real time;
   processing said video feed by a video-processing unit to determine if a smoking product is within a field of view of said at least one NIR/IR video capturing unit, said processing comprising;
   reading, via said video-processing unit, a near infrared video sequence captured from said at least one NIR/IR video capturing unit;
   performing via a background subtraction module of said video-processing unit a background subtraction on each frame of said captured video;
   identifying, via a hot spot tracking module of said video-processing unit, a hot spot of a predetermined size based on pixel color information associated with said smoking product;
   tracking via said hot spot tracking module of said video-processing unit, a motion of said hot spot; and
   determining a presence of said smoking product based on motion information comprising said background subtraction and said tracking of said hot spot.

2. The method of claim 1 further comprising detecting said hot spot based on color information via a thresholding operation, wherein all pixels thereof possess intensity values larger than a particular threshold.

3. The method of claim 2 further comprising selecting an optimal threshold from a channel having a pixel level intensity histogram that provides an optimal separation between said hot spot and background pixels according to a target metric being optimized, if said at least one NIR/IR video capturing unit comprises a camera sensor having multiple channels.

4. The method of claim 3 further comprising detecting said hot spot based on a spatial relationship between pixels.

5. The method of claim 4 further comprising defining said spatial relationship by at least one of all of the following: neighbor connectivity, morphological opening, and morphological closing.

6. The method of claim 4 wherein tracking a motion of said hot spot with said hot spot tracking module further comprises triggering an alarm if a pattern of motion of said hot spot is consistent with a smoking product being smoked.

7. The method of claim 2 further comprising performing said background subtraction with respect to at least one image captured by said at least one NIR/IR infrared video capturing unit utilizing a background.

8. The method of claim 7 wherein performing said background subtraction further comprises:
   computing an absolute color difference between said background and said at least one image in said near infrared video sequence when said at least one NIR/IR video capturing unit is stationary with controlled lighting.

9. The method of claim 8 further comprising performing said background subtraction wherein said background subtraction comprises:
   determining an absolute difference between adjacent frames in said near infrared video sequence.

10. The method of claim 9 wherein performing said background subtraction comprises:
    averaging a set of video frames over a specified period of time to yield an estimate of a background image; and
    computing an absolute color difference between said estimate of said background image and said at least one image in said near infrared video sequence.

11. The method of claim 7 wherein said background subtraction comprises:
calculating a temporal histogram of pixel values within a set of video frames being considered for each pixel; and
performing a clustering operation with respect to a most frequent pixel value that is considered as a background value to determine boundaries between said background value and a foreground value.

12. The method of claim 10 further comprising capturing a low-end portion of a near-infrared spectrum utilizing said at least one NIR/IR video capturing unit, said at least one NIR/IR video capturing unit comprising a video capturing unit that captures visible light upon removal of an infrared filter.

13. The method of claim 10 further comprising:
monitoring a presence of said hot spot by determining a color separation between a plurality of pixels in said lit cigarette image and a plurality of pixels in said background image; and
performing a thresholding operation to determine whether a size of said moving hot spot is equal to an expected size of said lit cigarette tip based on said pixel color information.

14. The method of claim 6 wherein determining a presence of said smoking product based on motion information further comprises:
computing one of a similarity measure between an actual motion pattern and a motion template; and
triggering a pre-specified event if said computed similarity measure is above a predetermined threshold.

15. The method of claim 14 further comprising preprocessing said hot spot motion pattern prior to said template matching.

16. The method of claim 15 wherein said preprocessing of said hot spot motion pattern comprises at least one of the following types of preprocessing operations:
prescreening said hot spot motion pattern based on an object speed;
performing a speed-based trajectory normalization with respect to said hot spot motion pattern; and
performing a trajectory smoothing operation to remove frame-to-frame inconsistencies with respect to said hot spot motion pattern.

17. The method of claim 1 further comprising configuring said at least one NIR/IR video capturing unit to further comprise a filter that blocks visible radiation in order to reduce signals associated with said visible radiation and thereby yield a more accurate determination of said hot spot.

18. The method of claim 17 further comprising utilizing a knowledge of a geometry of a viewing configuration to determine an expected size of said hot spot in terms of a number of pixels.

19. The method of claim 18 wherein said smoking product comprises at least one of:
a cigarette having a diameter of approximately 7 mm;
a cigar having a diameter in a range of approximately 7 mm to 20 mm.

20. The method of claim 18 wherein said hot spot comprises a hot spot of interest having a size in a range of approximately 2 mm to 50 mm).

21. A system for detecting a smoking product, said system comprising:
a video-processing unit comprising a background subtraction module and a hot spot tracking module;
at least one NIR/IR video capturing unit that communicates with said video processing unit, wherein said at least one NIR/IR video capturing unit captures a video feed in real time;
wherein said video-processing unit reads a near infrared video sequence from said at least one NIR/IR video capturing unit;
wherein said background subtraction unit performs a background subtraction on each frame of said captured video;
wherein said hot spot tracking module identifies a hot spot of a predetermined size based on pixel color information and tracks a motion of said hot spot; and
wherein said video-processing unit determines a presence of a smoking product based on motion information comprising said background subtraction and said tracking of said hot spot.

22. The system of claim 21 wherein a motion of said hot spot is tracked by said hot spot tracking module in response to a detection of said hot spot in order to thereafter trigger an alarm if a pattern of motion associated with said hot spot is consistent with a smoking product being smoked.

23. The system of claim 22 wherein said background subtraction is performed with respect to at least one image captured by said at least one NIR/IR video capturing unit utilizing a background.

24. The system of claim 23 wherein said hot spot is detectable based on color information via a thresholding operation such that all pixels thereof possess intensity values larger than a particular threshold, if said at least one NIR/IR video capturing unit comprises a single channel camera sensor.

25. The system of claim 23 wherein an optimal threshold is selectable from a channel having a pixel intensity level histogram that provides an optimal separation between said hot spot and background pixels according to a target metric being optimized, if said at least one NIR/IR video capturing unit comprises a camera sensor having multiple channels.

26. The system of claim 25 wherein said hot spot is detectable based on a spatial relationship between pixels.

27. The system of claim 26 further comprising defining said spatial relationship by at least one of all of the following: neighbor connectivity, morphological opening, and morphological closing.

28. The method of claim 21 further comprising:
monitoring a presence of said hot spot is by determining a color separation between a plurality of pixels in said lit cigarette image and a plurality of pixels in said background image; and
performing a thresholding operation to determine whether a size of said moving hot spot is equal to an expected size of said lit cigarette tip based on said pixel color information.

29. The method of claim 21 wherein a knowledge of a geometry of a viewing configuration is utilized to determine an expected size of said hot spot in terms of a number of pixels.

* * * * *